United States Patent [19]
Amada et al.

[11] Patent Number: 5,341,248
[45] Date of Patent: Aug. 23, 1994

[54] MAGNETIC RECORDING/REPRODUCING APPARATUS HAVING HEAD STRUCTURE FOR SELECTIVELY RECORDING/REPRODUCING EITHER OF TWO KINDS OF SIGNALS CONTAINING DIFFERENT AMOUNTS OF INFORMATION

[75] Inventors: Nobutaka Amada; Harushige Nakagaki; Takao Arai; Takaharu Noguchi, all of Yokohama, Japan

[73] Assignee: Hitachi, Ltd., Tokyo, Japan

[21] Appl. No.: 12,754

[22] Filed: Feb. 3, 1993

[30] Foreign Application Priority Data

Feb. 5, 1992 [JP] Japan .................. 4-019802

[51] Int. Cl.$^5$ .............................................. H04N 5/78
[52] U.S. Cl. ...................................... 360/33.1; 360/64; 358/330; 358/335
[58] Field of Search ............. 360/64, 33.1, 22, 8, 360/9.1, 10.3, 73.04, 73.05; 358/330, 310, 335

[56] References Cited
U.S. PATENT DOCUMENTS 4,040,101  8/1977  Zoellner et al. ............... 360/64
4,730,222  3/1988  Schauffele ................. 360/33.1 X
5,175,630  12/1992 Tabuchi et al. ............... 360/64 X

OTHER PUBLICATIONS

"Television Gakkai-Shi" (The Journal of the Institute of Television Engineers of Japan), vol. 42, No. 4 (Apr., 1988), pp. 338-346.
Yamashitsu et al. "An Experimental Study on bit rate reduction and High Density Recording For A Home-Use Digital VTR", IEEE Transactions on Consumer Electronics, vol. 34, No. 3 Aug. 1988 pp. 588-596.

Primary Examiner—Andrew L. Sniezek
Attorney, Agent, or Firm—Antonelli, Terry, Stout & Kraus

[57] ABSTRACT

A magnetic recording/reproducing apparatus is provided which includes a head structure compatible with a long-time play mode in handling either of two kinds of signals containing different amounts of information, such as a current digital picture signal and a high-definition (HD) digital picture signal in the rate of two to one at a constant number of revolutions of the drum by restricting an increase of the number of heads. In an aspect of the apparatus, four heads are arranged on the rotating drum equally 90° spaced, a fifth head of an opposite azimuth is mounted close to any of those heads, the number of drum revolutions is increased to twice larger than the normal number, the current digital picture signal is recorded and reproduced for each channel by using two heads, that is, the fifth head and a head positioned 180° opposite to the fifth head. On the other hand, the HD digital picture signal, containing twice as much information as the current digital picture signal, is recorded and reproduced for two channels by four heads equally 90° spaced, exclusive of the fifth head. According to another aspect, eight heads are arranged on the rotating drum equally 45° spaced, ninth and tenth heads of an opposite azimuth are mounted respectively close to any two heads 180° opposite to each other, and the normal number of drum revolutions is used.

16 Claims, 10 Drawing Sheets

MAGNETIC RECORDING/REPRODUCING APPARATUS HAVING HEAD STRUCTURE FOR SELECTIVELY RECORDING/REPRODUCING EITHER OF TWO KINDS OF SIGNALS CONTAINING DIFFERENT AMOUNTS OF INFORMATION

BACKGROUND OF THE INVENTION

The present invention relates to a magnetic recording/reproducing apparatus of the helical scanning system using rotating heads, and more particularly to a magnetic recording/reproducing apparatus having a head structure suitable for selectively recording and reproducing either of two kinds of signals containing different amounts of information in the ratio of two to one.

An example of a signal including two kinds of signals with diffrent amounts of information is the digital picture signal. There are two kinds of digital picture signal. One is a digital picture signal of the 525-line/60-field system or the 625-line/50-field system (hereafter referred to as the current digital picture signal), and the other is a high-quality digital picture signal of the 1125-line/60-field system, for example, (hereafter referred to as the HD digital picture signal).

At present, as recording apparatus of the current digital picture signal, the so-called D1-VTR, D2-VTR, etc. have been put into practical business use. With regard to the D1 format for the D1-VTR and the D2 format for the D2-VTR, description has been made in "Television Gakkai-Shi" (the Journal of the Institute of Television Engineers of Japan ), Vol. 42, No. 4 (April, 1988), pp. 338–346. As regards the recording apparatus of the HD digital picture signal, a digital VTR using a one-inch tape has been used for commercial purposes. However, a digital VTR has not been created which can record and reproduce both the current digital picture signal and the HD digital picture signal in a single machine.

When assumption is made that a home-use digital VTR is produced which is compatible with high definition television (HDTV) broadcasting expected to put into a full-fledged operation in the near future, it is naturally desired that the digital VTR can record and reproduce both the current digital picture signal and the HD digital picture signal with a common cassette tape and a common scanner (drum and heads). Further, as it is produced for home use, the VTR should be a less expensive system.

FIG. 14 shows a possible structure of recording/reproducing heads in the above-mentioned home-use digital VTR. Heads 20a and 20b of a double azimuth head are mounted 180° opposite to heads 21a and 21b of another double azimuth head, so that the wrapping angle of the magnetic tape 3 is 180° as in the ordinary VTR for home use. When the digital picture signal is used, the amount of information handled is greater, and therefore, even when the current digital picture signal is handled, in order to accommodate the narrower track for higher recording density and the increasing amount of information transmitted, the apparatus in general use in the future will be a type of two-channel simultaneous recording. With regard to this technique, refer to Yamashita et al. "AN EXPERIMENTAL STUDY ON BIT RATE REDUCTION AND HIGH DENSITY RECORDING FOR A HOME-USE DIGITAL VTR", IEEE Transactions on Consumer Electronics, Vol. 34, No. 3, August 1988, pp. 588–596, especially FIG. 6.

FIG. 15 shows the pattern (on magnetic face) of the signal tracks of the tape on which information is recorded with the heads structured as shown in FIG. 14. The + azimuth heads 20a and 21a and the − azimuth heads 20b and 21b are set which have a wide width with respect to the track pitch P in order to perform guardbandless recording. In recording, if the heads 20a and 20b operating as one body start tracing from the point A, the heads 21a and 21b which come round after the drum rotates 180° will start tracing from the point B. By tracing by the heads 21a and 21b, the previously recorded track is erased (overwritten by the head 21a) for a width corresponding to $\Delta P$ in FIG. 15. There are differences in the mounted height between the heads 20a and 20b, and between the heads 21a and 21b (not at the same height). This height difference is set according to specifications of the tape speed and the head width so that uniform signal tracks with track pitches P of two channels are formed as illustrated. The L in FIG. 15 is the track length, which is substantially equal to the wrapping length of tape on the rotating drum 4 (diameter D).

FIG. 16 shows how the recorded tape in FIG. 5 is played back. In reproduction, by control (not shown) of a known capstan motor for driving the tape 3, the heads 20a, 20b and 21a, 21b trace along the centers of the recorded tracks. Further, during reproduction, information is outputted for two channels simultaneously as shown by (b) in FIG. 17 at the drum rotation periods T as shown by (a) in FIG. 17.

Let us consider how to make the conventional home-use digital VTR compatible with the HD digital picture signal by using the two-channel simultaneous recording/reproducing system in FIG. 14.

Even when it is assumed that the amount of information of the HD digital picture signal can be compressed to about twice as much as the current digital picture signal by employing the bit rate reduction technology, if attempts are made to provide compatibility with the HD digital picture signal by using the system in FIG. 14, it follows that twice as much information as with the current digital picture signal must be handled. As measures for this, there are two possible methods.

The first method is to control the switch-over of the number of drum revolutions to twice faster drum speed with respect to the current digital picture signal processing speed, thereby increasing the amount of information that can be recorded in the same period of time to twice as large as before.

The second method is to keep the same number of drum revolutions as with the current digital picture signal, double the number of heads, and control the switch-over of the number of the heads used.

FIG. 18 shows a first method by which to control switch-over of the number of drum revolutions, and indicates the state in which the number of drum revolutions is made twice faster ($2 \times N$) and accordingly, the tape feeding speed is made twice faster ($2 \times V$) when the HD digital picture signal is used than in the case where the current digital picture signal is handled as in FIG. 14. The other structural arrangement is the same as in FIG. 14. FIG. 19 shows how the signals are outputted during playback by the structural arrangement in FIG. 18. As the number of drum revolutions is increased twice as high as before, signals for four tracks same as in FIG. 17, that is, twice as much information can be handled in the drum rotation period of T/2, which is one-half of the drum rotation period T in playback of the current digital picture signal in FIG. 17. It ought to be noted that in recording the signal by the structural arrangement of FIG. 18, only the number of drum revolutions and the tape speed are made twice higher, but the other recording conditions remain unchanged as in the case of recording the current digital picture signal, in other words, the tracks on which signals are recorded are the same as in FIG. 15, and the track pitch, too, is the same as in the conventional arrangement in which the drum speed and the tape speed are half as high as in recording the current digital picture signal. In the structure in FIG. 18, the only changed recording condition is a decrease in the recording time resulting from the twice increased tape feeding speed. To be more specific, the recording time of the HD digital picture signal is reduced by half from the recording time of the current digital picture signal by the structure in FIG. 14.

FIG. 20 shows the second method mentioned above which increases the number of heads, and the only difference of this head structure from FIG. 14 is that addition of two pairs of double azimuth heads 22a, 22b and 23a, 23b disposed at 180° opposite positions and at right angles with the heads 20a, 20b and 21a, 21b. When the current digital picture signal is processed, as in FIG. 14, only a pair of the heads comprising 20a, 20b and 21a, 21b is selected and used to perform the same operation shown in FIG. 17. When the HD digital picture signal is processed, another pair of heads 22a, 22b and 23a, 23b is used in addition to the pair of heads 20a, 20b and 21a, 21b, and thereby the number of heads used is doubled.

FIG. 21 shows how the signals are outputted during playback by the structual arrangement in FIG. 2.

However, the above methods respectively have problems. To be more specific, by the first method to control switch-over of the number of drum revolutions, the number of drum revolutions is increased to an ultra-high speed, that is, twice faster than several thousand rpm even when the current digital picture signal is processed, and what is more serious is that the frequency of the reproduced signal changes in the ratio of two to one. Here let us consider the frequency f of the signal reproduced by the heads. When the head scanning velocity is denoted by v and the recording wavelength by $\lambda$ (constant), the relation $v = f \times \lambda$ is well known, and from this relation, if, for processing the HD digital picture signal, the number of drum revolutions is increased twice faster than when the current digital picture signal is processed, the head scanning speed v, too, becomes twice faster, so that the frequency of the reproduced signal becomes twice higher. Though the digital VTR is consequently compatible with different picture signals of two different systems, containing different amounts of information, it is necessary to provide a couple of head-reproduced signal waveform equalizer circuits and a couple of data strobe circuits.

Further, the second method has a fixed number of drum revolutions, and therefore, the frequency of the reproduced signal remains unchanged, but the second method requires eight heads, which requires the number of reproduction amplifiers to be increased. Another problem with the second method is complicated adjustment of the mounting heights of the heads for securing equal recorded track pitches. These problems are undesirable in respects of price and production.

The first and the second methods have a fatal defect attending on simultaneous recording of the two channels. Specifically, this is a problem of inability to accommodate the long-time play mode even though it is possible to achieve compatibility with the current and HD digital picture signals.

The long-time play mode is to cut in half the pitch of the recorded tracks by reducing the tape running speed by half, for example, while the normal number of drum revolutions is kept, and to thereby record twice larger amount of information as in the standard play mode. By the head structure for two-channel simultaneous recording or reproduction, when the number of drum revolutions is fixed and the tape speed is reduced by half, in the structure of FIG. 14, for example, as shown in FIG. 15, the tracing start point of the heads 21a, 21b is shifted from B to C, and furthermore, the tracing start point of the heads 20a, 20b which come round next is shifted successively in the leftward tape running direction of the diagram. Accordingly, as shown in FIG. 22, not only the track pitch of the + azimuth head is not narrowed to have the same pitch as in the standard play mode, but also only the track pitch of the − azimuth head is narrowed as it is erased by overwriting.

In order to solve this problem, a possible measure will be to mount a head dedicated to the long-time play mode separate from the standard play mode, but this simply makes the head structure more complicated, so that this measure has no realizability.

SUMMARY OF THE INVENTION

Therefore, it is an object of the present invention to provide a magnetic recording/reproducing apparatus which solves the problems of the abovementioned prior art, and which has a head structure devised to handle multiple kinds of signals containing different amounts of information in the ratio of 2 to 1, such as the current digital picture signal, the HD digital picture signal, or the like, at a fixed number of drum revolutions by restricting an increase of the number of heads, and which is compatible with the long-time play mode of any of the multiple signals.

In order to achieve the above object, according to an aspect of the present invention, four heads are arranged on the rotating drum equally 90° spaced between them, any one of the heads has a fifth head of an opposite azimuth mounted close to it, and by increasing the number of drum revolutions twice (2×N) faster, the current digital picture signal is recorded and reproduced for each channel by two heads which are substantially 180°-oppositely-positioned and the fifth head, and on the other hand, the HD digital picture signal is recorded and reproduced for each two channels 90° apart by the four heads without using the fifth head.

Or, eight heads are arranged on the rotating drum equally 45° spaced between them, and any two 180°-oppositely-positioned have ninth and tenth heads of opposite azimuths mounted close to the respective heads, and by using the number of drum revolutions as is (N), the current digital picture signal is recorded and reproduced for two channels by four heads equally 90° spaced between them including the ninth and the tenth heads, and on the other hand, the HD digital picture signal is recorded and reproduced in four channels by the eight heads equally 45° spaced without using the ninth and the tenth heads.

By the above arrangement, the magnetic recording/reproducing apparatus is capable of using a fixed frequency of the reproduced signal by using a fixed number of drum revolutions in processing both the current digital picture signal and the HD digital picture signal, and is doubtless capable of simplifying the configurations of the waveform equalizer circuit and the data strobe circuit of the signal reproducing system, and is also capable of recording and reproducing both the current and HD digital picture signals in the long-time play mode with uniform track pitches common to both kinds of signals by a necessary minimum number of heads (at a number of drum revolutions of 2N) or by ten heads (at a number of drum revolutions of N).

Further, if the product of the rotating drum diameter D and the tape wrapping angle $\alpha$ is constant, when the drum diameter is doubled, for example, by reducing the tape wrapping angle to ½, the recorded track length is prevented from varying, so that the enlargement of the drum diameter makes it easy to mount a plurality of heads.

DESCRIPTION OF THE EMBODIMENTS

Embodiments of the present invention will be described in detail with reference to the accompanying drawings.

Figure 1:
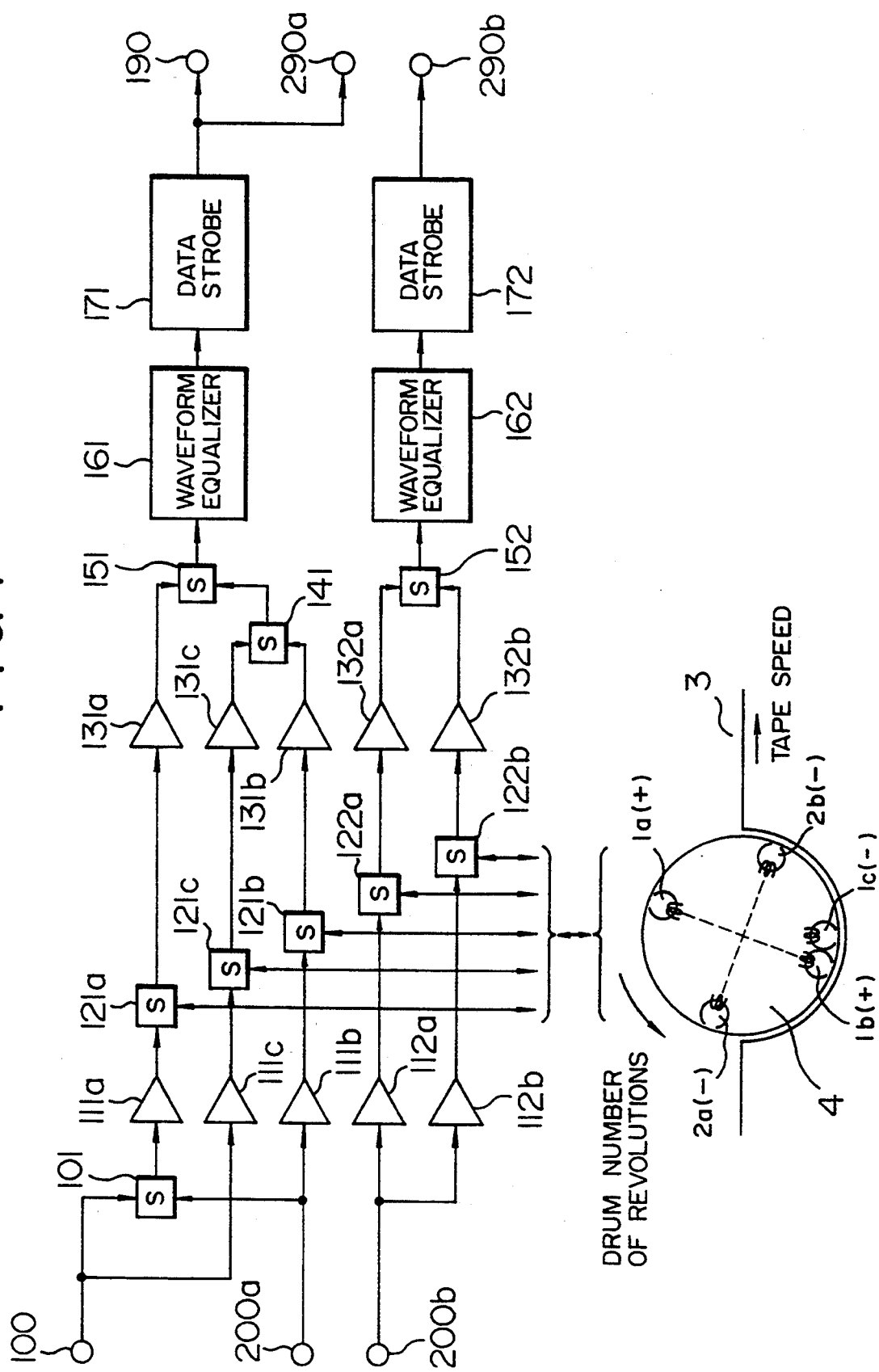
FIG. 1 is a block diagram showing an embodiment of the magnetic recording/reproducing apparatus according to the present invention.

FIG. 1 is a block diagram showing an embodiment of the magnetic recording/reproducing apparatus according to the present invention. In FIG. 1, reference numerals 1a, 1b, 1c, 2a, and 2b denote magnetic heads, 3 denotes a magnetic tape, 4 denotes a rotating drum, 100 denotes an input terminal of the current digital picture signal, 200a and 200b denote input terminals of the HD digital picture signal, 101 denotes a selection switch circuit for the current digital picture signal and the HD digital picture signal, 111a, 111b, 111c, 112a, and 112b denote recording amplifiers, 121a, 121b, 121c, 122a, and 122b denote recording/reproduction selection switch circuits, 131a, 131b, 131c, 132a, and 132b denote reproduction amplifiers, 141, 151 and 152 denote reproduced signal selection switch circuit, 161 and 162 denote waveform equalizer circuits, 171 and 172 denote data strobe circuits, 190 denotes an output terminal of the current digital picture signal, and 290a and 290b denote output terminals of the HD digital picture signal.

The features of the head structure according to this embodiment are that the heads are provided to record the current digital picture signal on one channel (two tracks in one drum rotation), and the HD digital picture signal on two channels (four tracks in one drum rotation), that the magnetic heads $1a(+)$, $1b(+)$, $2a(-)$ and $2b(-)$ are arranged on the rotating drum equally 90° spaced between them, that another magnetic head $1c(-)$ is additionally mounted close to the magnetic head $1b(+)$, and that the number of revolutions of the rotating drum 4 is twice higher (2×N) than in the prior art. The magnetic heads $1a(+)$, $1b(+)$, $2a(-)$, $2b(-)$, and $1c(-)$ are mounted at the same height, in other words, there is no difference in height among the heads. The drum diameter of the rotating drum 4 and the running speed and the wrapping angle of the magnetic tape 3 are the same, so that the track pitches and the track lengths are the same, respectively. The operation of this embodiment will be described in detail in the following.

A current digital picture signal input from the input terminal passes through the signal selection switch 101, the recording amplifier 111a, and the recording/reproduction selection switch 121a, and is recorded on a specified track on the magnetic tape 3 by the magnetic head $1a(+)$. On the other hand, a current digital picture signal, input directly to the recording amplifier 111c and passed through the recording/reproduction selection switch 121c, is recorded on a track adjacent to the above-mentioned track by the magnetic head $1c(-)$ in guard-bandless recording.

Figure 2:
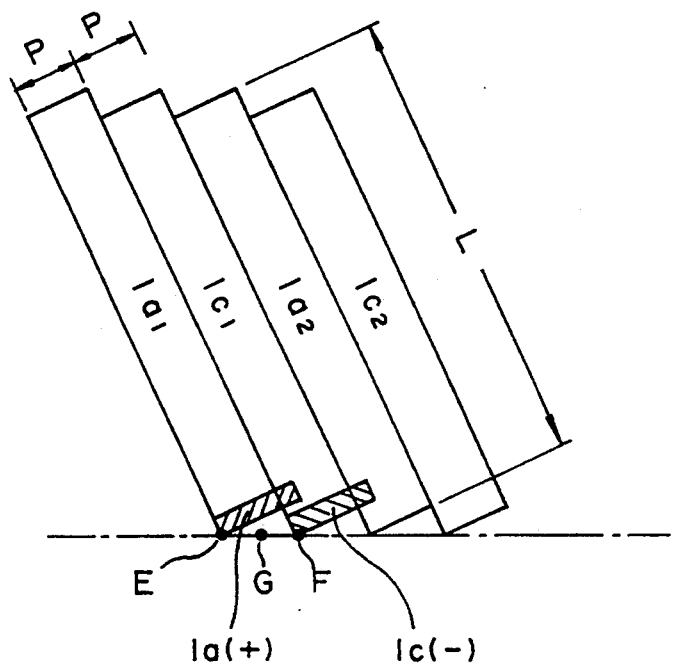
FIG. 2 is a pattern diagram showing tracks in recording in the embodiment in FIG. 1.

FIG. 2 shows the pattern (tape magnetic face) of the tracks in recording the current digital picture signal. If the head 1a(+) starts to trace the track 1a₁ from the point E, the head 1c(−), which comes round after the rotating drum rotates 180°, starts to trace the track 1c₁ from the point F. After another rotation of 180°, that is, after one rotation of the drum, again the + azimuth head 1a(+) traces the track 1a₂, thus forming the tracks with uniform track pitches P.

Figure 3:
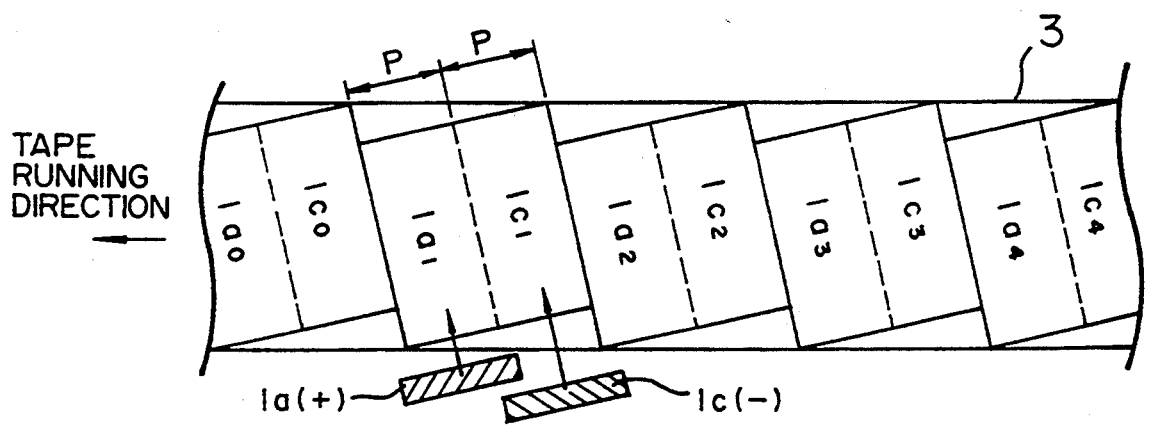
FIG. 3 is a pattern diagram showing tracks in reproduction in the embodiment in FIG. 1.

FIG. 3 is a diagram showing the tracks when the tape is played back which was recorded in the manner shown in FIG. 2. The heads 1a(+) and 1c(−) trace the centers of the recorded tracks.

Figure 4:
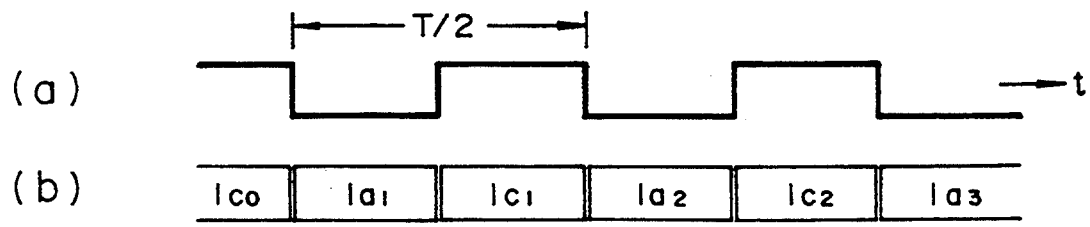
FIG. 4 is a waveform diagram showing the timing in reproduction of the current digital picture signal in the embodiment in FIG. 1.

The signals reproduced by the magnetic heads 1a(+) and 1c(−) as described are input to the reproduction amplifiers 131a and 131c through the recording/reproduction selection switch circuits 121a and 121c. The output signal of the reproduction amplifier 131a and the output signal of the reproduction amplifier 131c that has also passed through the signal selection switch circuit 141 are switched over by the signal selection switch circuit 151 in synchronism with a rotation period (T/2) of the rotating drum 4 (a waveform (a) in FIG. 4). Illustration (b) of FIG. 4 is a schematic diagram showing the timing by which the current digital picture signal is reproduced. The reproduced signal changed into one channel is equalized by the signal equalizer circuit 161, and digital data is reproduced in original form by the data strobe circuit 171 and output from the output terminal 190.

Description will next be made of the recording and playback operations of the HD digital picture signal containing a twice greater amount of information than the current digital picture signal. The HD digital picture signal is divided into signals in two channels so that the amounts of recording information for one channel is the same as in the current digital picture signal. The subdivided HD picture signals are input from the input terminals 220a and 200b, and one subdivided signal travels along one route, including the signal selection switch circuit 101, the recording amplifier 111a, the recording/reproduction switch circuit 121a, and also travels along another route, including the recording amplifier 111b and the recording/reproduction selection switch circuit 121b, and is recorded on specified tracks of the magnetic tape 3 by the 180° oppositely-positioned magnetic heads 1a(+) and 1b(+), while the other subdivided signal travels along one route, including the recording amplifier 112a, and the recording/reproduction selection switch circuit 122a, and also travels along the other route, including the recording amplifier 112b, and the recording/reproduction selection switch circuit 122b, and is recorded on tracks adjacent to the tracks mentioned above by the 180° oppositely positioned magnetic heads 2a(−) and 2b(−) in guardbandless recording.

The feeding speed of the magnetic tape 3 in the above recording is twice faster (2×V) than in the recording of the current digital picture signal as in the prior art. As mentioned above, the height difference among the magnetic heads 1a(+), 1b(+), 2a(−), and 2b(−) is zero, and therefore, the pattern of the tracks is the same as shown in FIG. 2, so that tracks with uniform pitches P are formed. In reproduction, the signals reproduced by the magnetic heads 1a(+) and 1b(+) are passed respectively through the recording/reproduction selection switch circuits 121a and 121b are inputted to the reproduction amplifiers 131a and 131b, and the output signal of the reproduction amplifier 131a and the output signal of the reproduction amplifier 131b that has also passed through the signal selection switch 141 are switched over by the signal selection switch circuit 151 in synchronism with a rotation period (T/2) of the rotating drum 4. The signals reproduced by the magnetic heads 2a(−) and 2b(−) are passed through the recording/reproduction selection circuits 122a and 122b, and are inputted to the reproduction amplifiers 132a and 132b. The output signals of the reproduction amplifiers 132a and 132b are switched over by the signal selection switch circuit 152 in synchronism with a rotation period (T/2) of the rotating drum 4 (a waveform (a) in FIG. 5).

Figure 5:
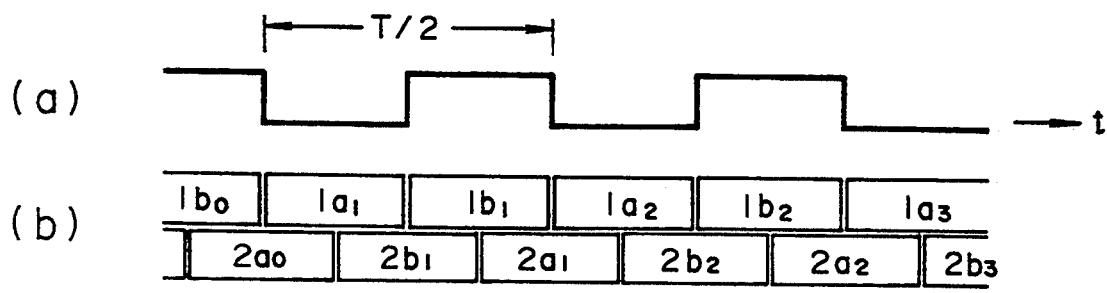
FIG. 5 is a waveform diagram showing the timing in reproduction of the HD digital picture signal in the embodiment in FIG. 1.

Illustration (b) of FIG. 5 is a schematic diagram showing the timing of reproduced signals. The reproduced signals of two channels are equalized by the waveform equalizer circuits 161 and 162, from which signals, digital data is reproduced in original form by the data strobe circuits 171 and 172, and is output from the output terminals 290a and 290b. The respective signals of two channels thus produced have the same amount of information as the current digital picture signal, which is advantageous because it is not only possible to use the common equalizer circuit 161 and the common data strobe circuit 171 for reproduction of both the current digital picture signal and the HD digital picture signal, but also the equalizer circuits 161 and 162 and the data strobe circuits 171 and 172 can respectively be of exactly the same characteristics, so that the circuit can be configured in a simple form.

The above-mentioned recording and playback operations are in the standard play mode. Those operations in the long-time play mode will be described in the following.

In the present invention, for recording both the current and the HD digital picture signals, the feeding speed of the magnetic tape 3 in the long-time play mode is set at 1/m (m is a real number more than 1 and less than 2), 1/1.5 (m=1.5) for example, and the other conditions and actions are exactly the same as in the standard play mode. Therefore, the pattern of the recorded tracks is the same as the pattern shown in FIG. 2 in recording the current and the HD digital picture signals, only difference being the track pitch of 1/1.5, so that a uniform pattern can be formed without unbalance of the track pitches as in the prior art. The above description applies to the playback mode.

As has been discussed, according to this embodiment, in processing the current and the HD digital picture signals, the reproduced signal frequency can be fixed with a constant number of drum revolutions, the configurations of the waveform equalizer circuit and the data strobe circuit of the signal reproduction system can of course be simplified, and by using five necessary minimum heads, it is possible to record and play back both the current and the HD digital picture signals in long-time play mode with uniform track pitches with both kinds of signals. There is another effect that since all heads are mounted at the same height, the conventional necessity of complicated adjustment of the head heights can be eliminated.

Incidentally, in the embodiment in FIG. 1, the recorded pattern is very slightly shifted depending on the mounting angles of the closely disposed magnetic heads 1b(+) and 1c(−) with respect to the magnetic head 1a(+). More specifically, if the magnetic heads 1a(+) and 1b(+) are 180° oppositely positioned, the magnetic heads 1a(+) and 1c(−), used to record the current digital picture signal, are not correctly 180° oppositely positioned, so that under this condition, the recorded pattern is shifted very slightly. Conversely, if the magnetic heads 1a(+) and 1c(−) are 180° oppositely positioned, the magnetic heads 1a(+) and 1b(+) are not correctly 180° oppositely positioned, so that the recorded pattern is shifted when recording the HD digital picture signal. If the magnetic head 1b(+) is positioned 180° opposite to the intermediate point between the magnetic heads 1b(+) and 1c(−), the amount of shift is reduced by half, but the shift occurs equally in recording the current and the HD digital picture signals. However, if a double azimuth structure is used in which the magnetic heads 1b(+) and 1c(−) are mounted on the same head base, the amount of shift is reduced to a very small amount, which is of least significance.

Figure 6:
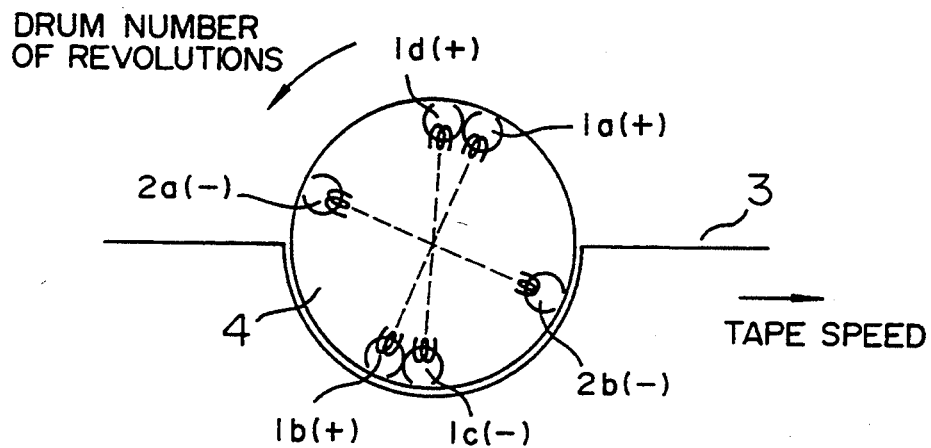
FIG. 6 is a head structure diagram showing another embodiment of the present invention.
Figure 7:
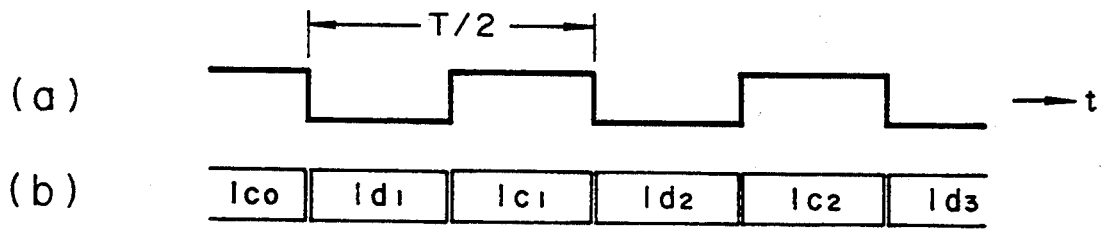
FIG. 7 is a waveform diagram showing the timing in reproduction of the current digital picture signal in the embodiment in FIG. 6.

FIG. 6 is a diagram of a head structure showing another embodiment of the present invention, which eliminates the above-mentioned shift of the recorded pattern. The features of this embodiment are that in addition to the embodiment of FIG. 1, a magnetic head 1d(+) is mounted close to the magnetic head 1a(+) and at a position 180° opposite to the magnetic head 1c(−), and that when recording and playing back the current digital picture signal, instead of the magnetic head 1a(+), the additionally mounted magnetic head 1d(+) and the magnetic head 1c(−) are used. Needless to say, the magnetic heads 1a(+) and 1b(+) are disposed at 180°-opposite positions. Illustration (b) of FIG. 7 is a schematic diagram showing the relation between the rotation period (T/2) of the rotating drum shown by a waveform (a) in FIG. 7 and the reproduced signals like in FIG. 2.

As described above, in this embodiment, a total of six heads are used, which arrangement provides an effect that the above-mentioned shift of the recorded pattern is eliminated, and an ideal recorded pattern is formed.

Figure 20:
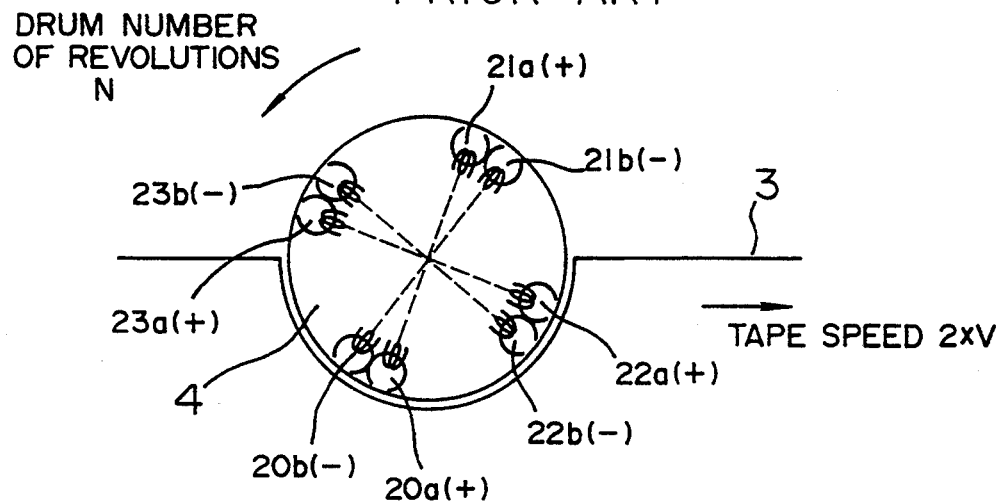
FIG. 20 is a diagram showing the prior-art head structure compatible with both the current and the HD digital picture signals.
Figure 21:
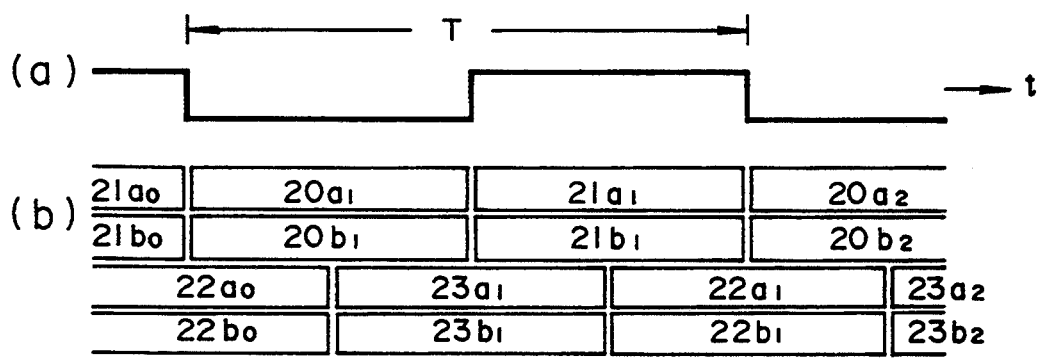
FIG. 21 is a waveform diagram showing the timing in reproduction of the HD digital picture signal in the prior art in FIG. 20.
Figure 22:
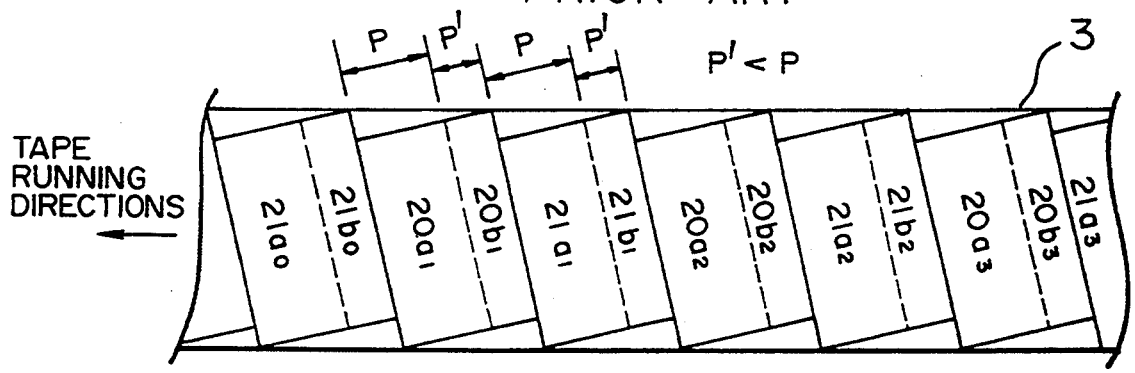
FIG. 22 is a pattern diagram showing tracks in recording in the long-time play mode with the prior-art head structure.

Meanwhile, in the embodiments in FIGS. 1 and 6, to comply with the condition of using the same recorded pattern as in the prior art in FIG. 20, in other words, under the condition that the same track pitch, the same track length, and the same recording wavelength are used, while the same drum diameter is maintained, the number of drum revolutions is doubled. However, the feature of the present invention lies in the head structure, and the present invention is not limited by the values of the drum diameter and the number of drum revolutions mentioned above and the feeding speed of the magnetic tape 3.

For example, under the condition that the linear recording density and the areal recording density are used, the track length need not be the same. In this case, it is also possible to double the drum diameter and use the same number of drum revolutions, but, needless to say, the head structure is exactly the same as in the embodiments in FIGS. 1 and 6. Therefore, the recorded pattern is basically the same as in FIG. 2, excepting that the track angle is different. By this arrangement, though the drum diameter is increased, the number of drum revolutions remains the same, so that the problem of increasing the rotating speed of the mechanical system can be solved.

Figure 8A:
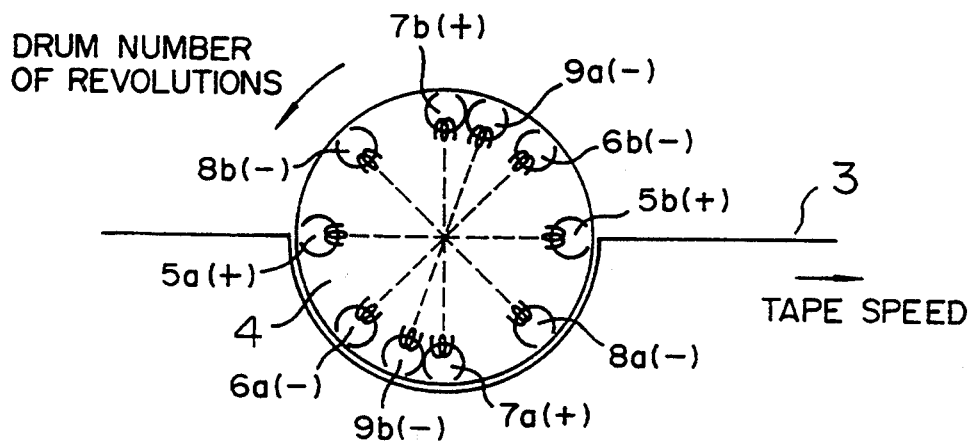
FIG. 8A is a head structure diagram showing yet another embodiment of the present invention and FIG. 8B is a head structure diagram of a further embodiment.

FIG. 8A is a diagram of a head structure showing yet another embodiment of the present invention, formed under the condition that the same recorded pattern and the same number of drum revolutions are used. As illustrated, magnetic heads 5a(+), 6a(−), 7a(+), 8a(−), 5b(+), 6b(−), 7b(+), and 8b(−) are arranged on the rotating drum equally 45° spaced, and a magnetic head 9a(−) is mounted close to the magnetic head 7b(+) and a magnetic head 9b(−) close to the magnetic head 7a(+), respectively, in order that, as in the prior art, the current digital picture signal is recorded in two channels (four tracks in one rotation of the drum) and the HD digital picture signal is recorded in four channels (eight tracks in one rotation of the drum). It goes without saying that the heads are mounted at the same height.

Figure 9:
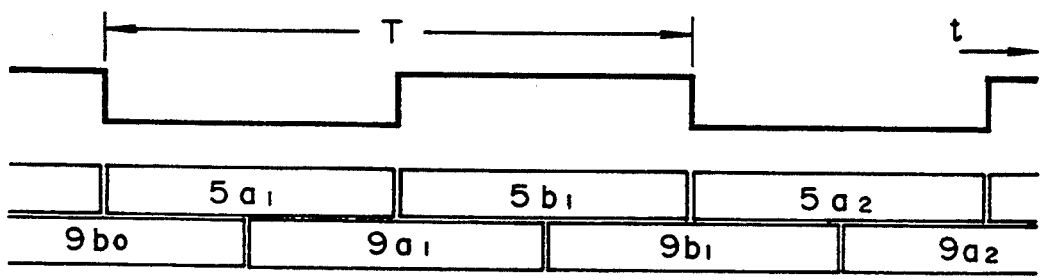
FIG. 9 is a waveform diagram showing the timing in reproduction of the current digital picture signal in the embodiment in FIG. 8.

The current digital picture signal is recorded on four tracks for one rotation of the drum in guard-bandless azimuth recording by the magnetic heads 5a(+), 9a(−), 5b(+), and 9b(−). Illustration (b) of FIG. 9 is a schematic diagram showing the timing of the reproduced signals with respect to a waveform (a) of the drum rotation period T. The reproduced signals of the two channels undergo waveform equalization and data strobe.

Figure 10:
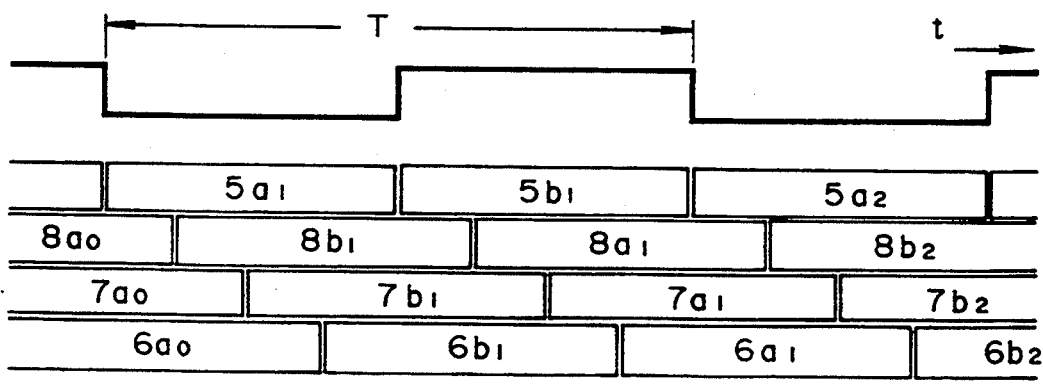
FIG. 10 is a waveform diagram showing the timing in reproduction of the HD digital picture signal in the embodiment in FIG. 8.

The HD digital picture signal is recorded on eight tracks in one rotation of the drum in guard-bandless azimuth recording by the magnetic heads 5a(+), 8b(−), 7b(+), 6b(−), 5b(+), 8a(−), 7b(+), and 6a(−). Illustration (b) of FIG. 10 is a schematic diagram showing the timing of the reproduced signals, and the reproduced signals undergo waveform equalization and data strobe with respect to a timing of the drum rotation period T shown in a waveform (a).

The above operations are the same in the standard play mode and the long-time play mode, and the recorded pattern is basically the same, excepting that the track pitch is different. In this embodiment, a total of ten heads are used, but a smaller number of drum revolutions is required, so that the problem of increasing the rotating speed of the mechanical system is solved. As for the number of heads, if attempts are made to achieve compatibility with the long-time play mode by the prior art, a total of 12 to 16 heads are hitherto required. In view of this, this embodiment offers an effect of reduction of the number of heads. Furthermore, since all heads are mounted at the same height, the conventional necessity of complicated adjustment of head heights can be obviated.

In this embodiment, like in the embodiment shown in FIG. 1, a minor problem of the shift of the recorded pattern is yet to be solved. With regard to this problem, as in the embodiment in FIG. 6, it is only necessary to mount magnetic heads 5a(+) and 5b(+) close to the two + azimuth heads, respectively.

Figure 8B:
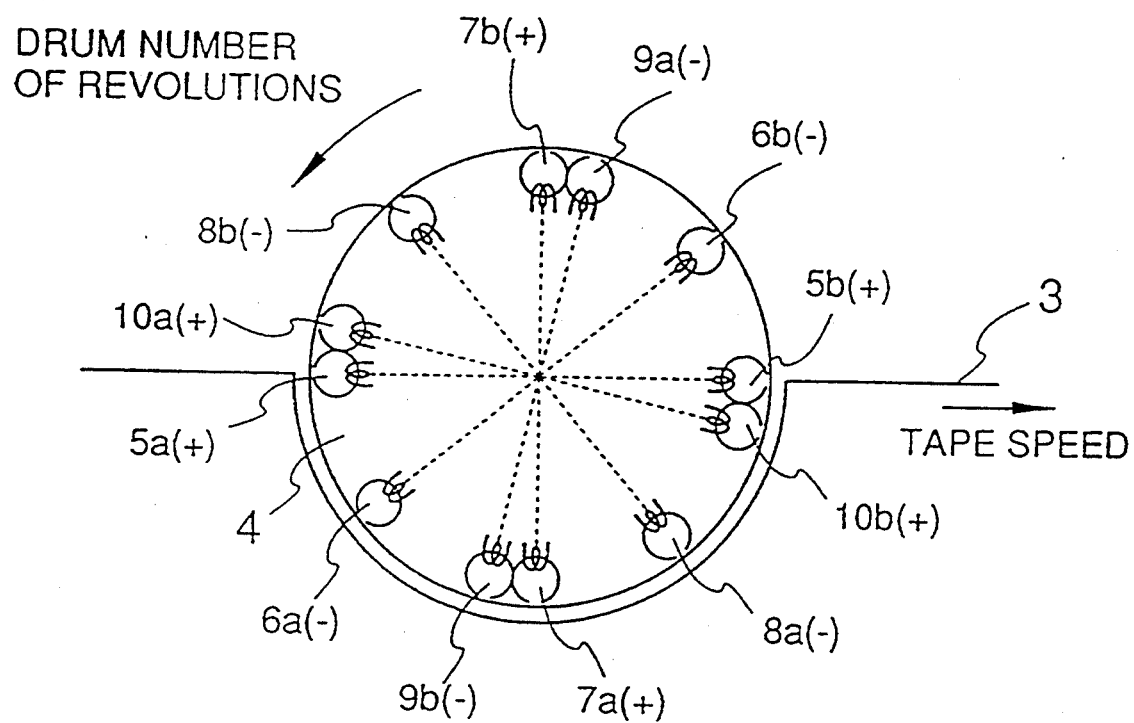

FIG. 8B diagrammatically shows a head structure having twelve heads in which magnetic heads 10a(+) and 10b(+) disposed at 180°-opposite positions are mounted on the rotating drum, close to the heads 5a(+) and 5b(+), respectively and are arranged 90°-spaced to the magnetic heads 9a(−), 9b(−), respectively. The current digital picture signal is recorded by using the magnetic heads 10a(+), 9a(−), 10b(+) and 9b(−). The HD digital picture signal is recorded in the similar manner to the embodiment of FIG. 8A.

Figure 11:
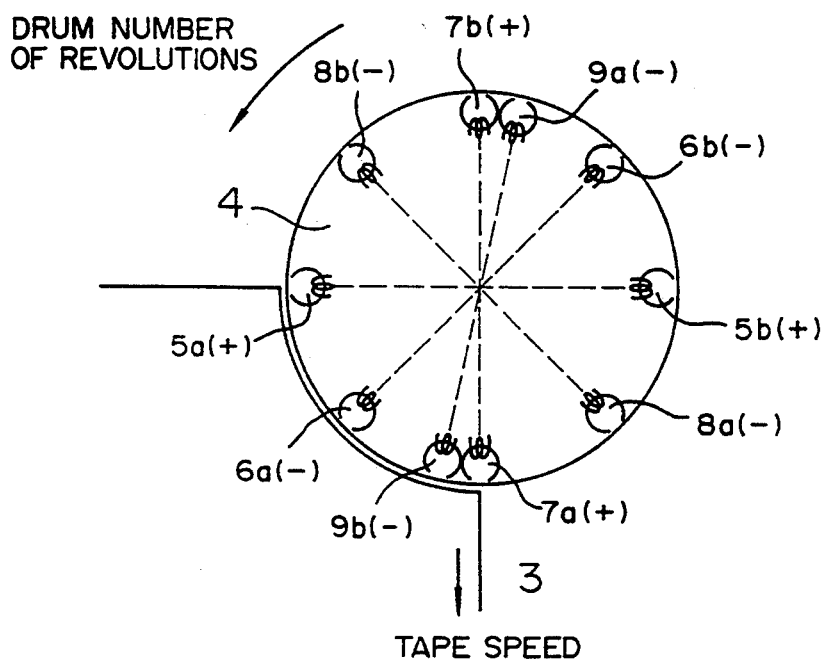
FIG. 11 is a head structure diagram showing a still further embodiment of the present invention.

FIG. 11 is a diagram of a head structure showing a still further embodiment of the present invention. The features of this embodiment are that in comparison with the embodiment shown in FIG. 8A, the diameter of the rotating drum 4 is twice larger (2×D) and the wrapping angle of the magnetic tape 3 is 90°. It is generally known that when the drum diameter is made k times larger (k is a given positive real number), if the tape wrapping angle is made 1/k, the track length remains unchanged, and the recorded pattern is identical, too. In this embodiment, 2 was selected as an example of k, and therefore, the recorded pattern is the same as in the embodiment in FIG. 8A.

Figure 12:
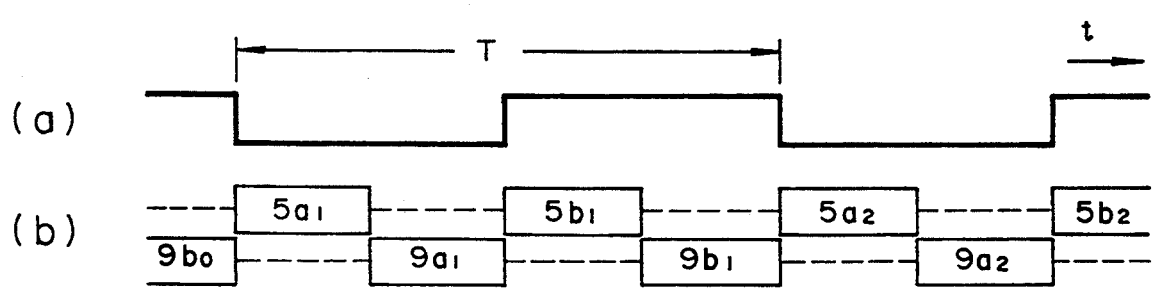
FIG. 12 is a waveform diagram showing the timing of the current digital picture signal in the embodiment in FIG. 11.

As for the operations in this embodiment, like in FIG. 8A, the current digital picture signal is recorded and reproduced on and from four tracks for one rotation of the drum in the guard-bandless azimuth manner by the magnetic heads 5a(+), 9a(−), 5b(+), and 9b(−). FIG. 12 is a diagram schematically showing the timing of the reproduced signals (b) with a waveform (a) of the drum rotation period T.

Figure 13:
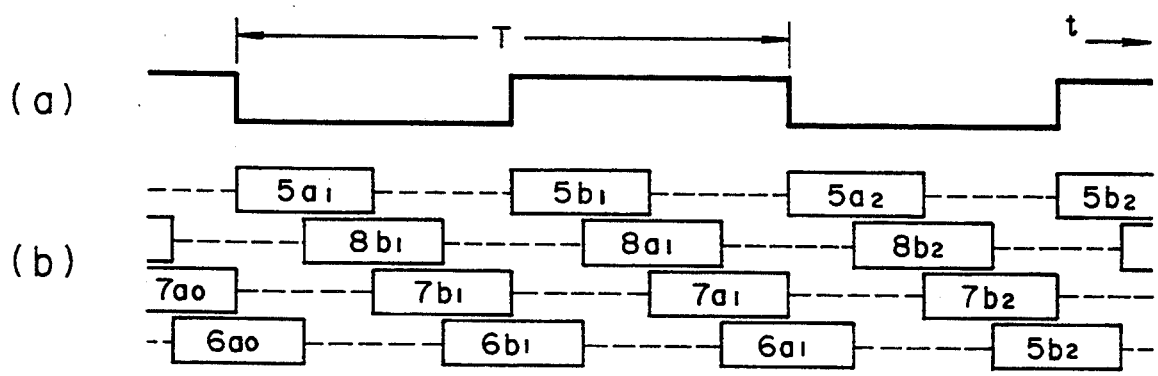
FIG. 13 is a waveform diagram showing the timing in reproduction of the HD digital picture signal in the embodiment in FIG. 11.
Figure 14:
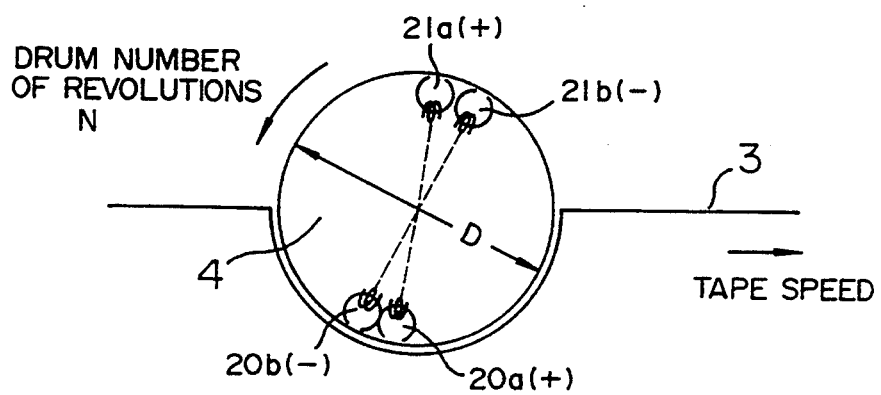
FIG. 14 is a diagram showing the prior-art head structure only suitable for the current digital picture signal.
Figure 15:
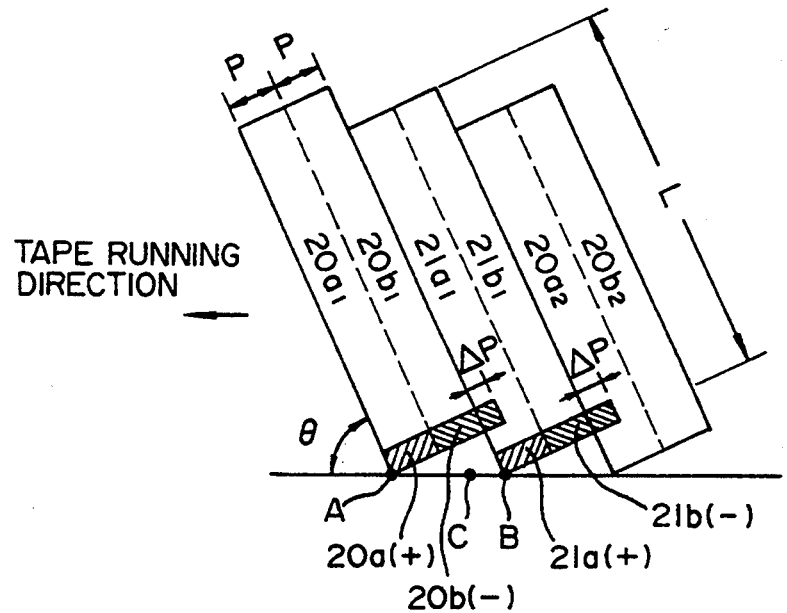
FIG. 15 is a pattern diagram showing tracks in recording in the prior art in FIG. 14.
Figure 16:
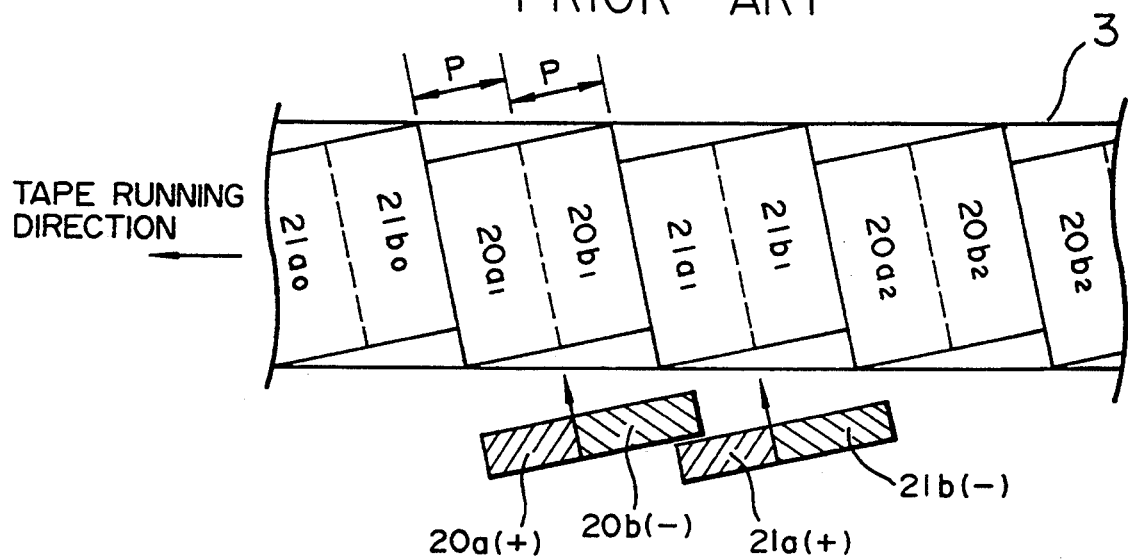
FIG. 16 is a pattern diagram showing tracks in reproduction in the prior art in FIG. 14.
Figure 17:
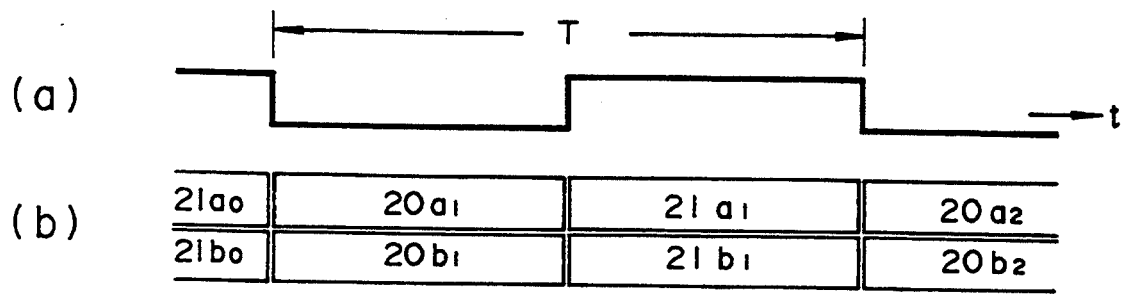
FIG. 17 is a waveform diagram showing the timing of the reproduced signal in the prior art in FIG. 14.
Figure 18:
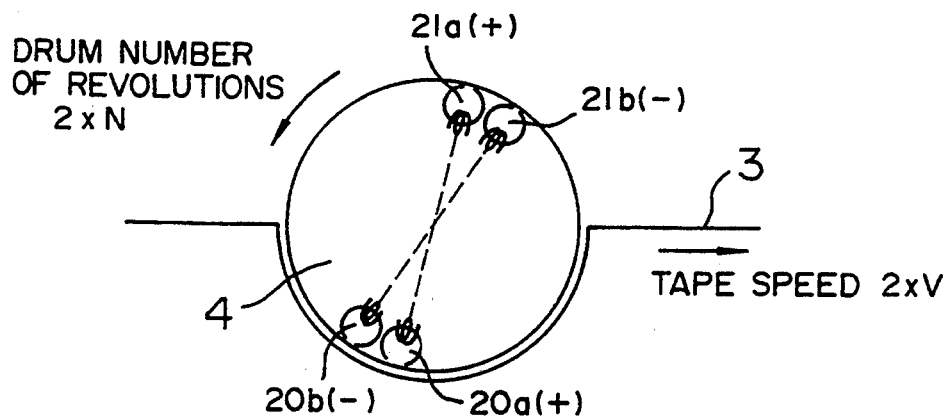
FIG. 18 is a diagram showing the prior-art head structure compatible with both the current and the HD digital picture signals.
Figure 19:
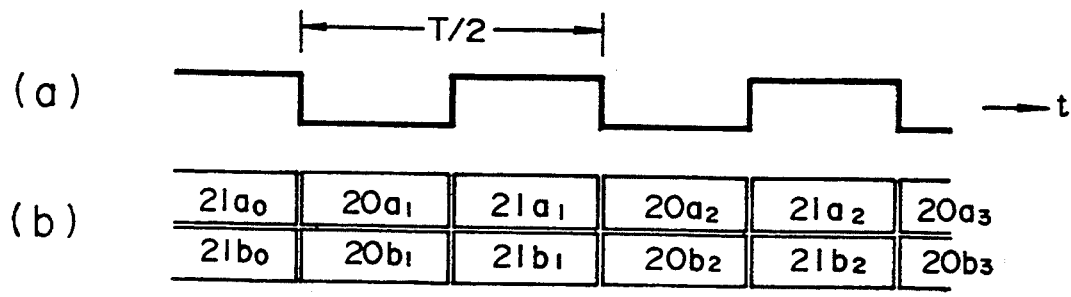
FIG. 19 is a waveform diagram showing the timing in reproduction of the HD digital picture signal in the prior art in FIG. 18.

Similarly, the HD digital picture signal is recorded and reproduced on and from eight tracks for one rotation of the drum in the guard-bandless azimuth manner by the magnetic heads 5a(+), 8b(−), 7b(+), 6b(−), 5b(+), 8a(−), 7b(+), and 6a(−). Illustration (b) of FIG. 13 is a schematic diagram showing the timing of the reproduced signals. The above operations are the same in the standard play mode and the long-time play mode with respect to a waveform (a) of the drum rotation period T.

In this embodiment, A factor of 2 was selected as an example of k, but it goes without saying that the present invention can be applied to any value of k.

As discussed above, in this embodiment, by enlarging the diameter of the drum, it becomes easy to mount a plurality of heads.

As described in the foregoing, according to the present invention, for processing the current and the HD digital picture signals, the frequency of the reproduced signals can be constant by a constant number of drum revolutions, it is of course possible to simplify the configuration of the waveform equalizer circuit and the data strobe circuit, or the like of the signal reproducing system, and the current and the HD digital picture signals can be recorded and reproduced in the long-time play mode with uniform track pitches for those kinds of signals by five necessary minimum heads (when the drum rpm is 2N) or by ten heads (when the drum rpm is N).

We claim:

1. A magnetic recording/reproducing apparatus for selecting either of a first digital information signal having a first amount of information per unit time or a second digital information signal having a twice larger amount of information per unit time than said first amount of information, and for recording/reproducing the information signal on/from tracks formed in a diagonal direction on a magnetic tape, said apparatus comprising:

a first magnetic head mounted at a first position on a rotary drum, and having a first azimuth angle;
a second magnetic head mounted at a second position on said rotary drum 180°-opposite to said first position, and having said first azimuth angle;
a third magnetic head mounted at a third position on said rotary drum 90°-separated from said first position in a direction opposite to the rotating direction of said rotary drum, and having a second azimuth angle of a polarity opposite to said first azimuth angle;
a fourth magnetic head mounted at a fourth position on said rotary drum 180°-opposite to said third position, and having said second azimuth angle;
a fifth magnetic head mounted at a position on said rotary drum close to said second magnetic head, and having said second azimuth angle;
first means for running said magnetic tape at a first speed, and for performing guard-bandless signal recording/reproducing on/from two tracks for one rotation of said rotary drum by using said first magnetic head and said fifth magnetic head, when recording/reproducing said first digital information signal; and
second means for running said magnetic tape at a speed n times (n is a real number more than 1) faster than said first speed, and for performing guard-bandless signal recording/reproducing on/from four tracks for one rotation of said rotary drum by using said first magnetic head, said third magnetic head, said second magnetic head and said fourth magnetic head, when recording/reproducing said second digital information signal.

2. A magnetic recording/reproducing apparatus according to claim 1,
wherein said second magnetic head and said fifth magnetic head are mounted on a common head base attached to said rotary drum.

3. A magnetic recording/reproducing apparatus according to claim 1, further comprising
a sixth magnetic head mounted at a position on said rotary drum close to said first magnetic head and 180°-opposite to said fifth magnetic head, and having said first azimuth angle, and
wherein said first means runs said magnetic tape at said first speed, and performs guard-bandless recording/reproducing of said first digital information signal on/from two tracks for one rotation of said rotary drum by using said sixth magnetic head and said fifth magnetic head.

4. A magnetic recording/reproducing apparatus according to claim 3,
wherein said second magnetic head and said fifth magnetic head, and said first magnetic head and said sixth magnetic head are mounted respectively on a common head base attached to said rotary drum.

5. A magnetic recording/reproducing apparatus for selecting either of a first digital information signal having a first amount of information per unit time or a second digital information signal having a twice larger amount of information per unit time than said first amount of information, and for recording/reproducing the information signal on/from tracks formed in a diagonal direction on a magnetic tape, said apparatus comprising:

a first magnetic head mounted at a first position on a rotary drum, and having a first azimuth angle;
a second magnetic head mounted at a second position on said rotary drum 180°-opposite to said first position, and having said first azimuth angle;
a third magnetic head mounted at a third position on said rotary drum 90°-separated from said first position in a direction opposite to the rotating direction of said rotary drum, and having a second azimuth angle of a polarity opposite to said first azimuth angle;
a fourth magnetic head mounted at a fourth position on said rotary drum 180°-opposite to said third position, and having said second azimuth angle;
a fifth magnetic head mounted at a position on said rotary drum close to said second magnetic head, and having said second azimuth angle;
first means for running said magnetic tape at a first speed, and for performing guard-bandless signal recording/reproducing on/from two tracks for one rotation of said rotary drum by using said first magnetic head and said fifth magnetic head, when recording/reproducing said first digital information signal;

second means for running said magnetic tape at a speed n times (n is a real number more than 1) faster than said first speed, and for performing guard-bandless signal recording/reproducing on/from four tracks for one rotation of said rotary drum by using said first magnetic head, said third magnetic head, when recording/reproducing said second digital information signal;

third means for running said magnetic tape at a second speed 1/m (m is a real number more than 1 and less than 2) of said first speed, and for performing guard-bandless signal recording/reproducing on/from two tracks for one rotation of said rotary drum by using said first magnetic head and said fifth magnetic head, said second magnetic head and said fourth magnetic head when recording/reproducing said first digital information signal; and fourth means for running said magnetic tape at a speed n times faster than said second speed, and for performing guard-bandless signal recording/reproducing on/from four tracks for one rotation of said rotary drum by using said first magnetic head, said third magnetic head, said second magnetic head and said fourth magnetic head, when recording/reproducing said second digital information signal.

6. A magnetic recording/reproducing apparatus according to claim 5,
wherein said second magnetic head and said fifth magnetic head are mounted on a common head base attached to said rotary drum.

7. A magnetic recording/reproducing apparatus according to claim 5, further comprising
a sixth magnetic head mounted at a position on said rotary drum close to said first magnetic head and 180°-opposite to said fifth magnetic head, and having said first azimuth angle, and
wherein said first means runs said magnetic tape at said first speed, and performs guard-bandless recording/reproducing of said first digital information signal on/from two tracks for one rotation of said rotary drum by using said sixth magnetic head and said fifth magnetic head, and
wherein said third means runs said magnetic tape at said second speed, and performs guard-bandless recording/reproducing of said first digital information signal on/from two tracks for one rotation of said rotary drum by using said sixth magnetic head and said fifth magnetic head.

8. A magnetic recording/reproducing apparatus according to claim 7,
wherein said second magnetic head and said fifth magnetic head, and said first magnetic head and said sixth magnetic head are mounted respectively on a common head base attached to said rotary drum.

9. A magnetic recording/reproducing apparatus for selecting either of a first digital information signal having a first amount of information per unit time or a second digital information signal having a twice larger amount of information per unit time than said first amount of information, and for recording/reproducing the information signal on/from tracks formed in a diagonal direction on a magnetic tape, said apparatus comprising:

a first magnetic head mounted at a first position on a rotary drum, and having a first azimuth angle;

a second magnetic head mounted at a second position on said rotary drum 180°-opposite to said first position, and having said first azimuth angle;

a third magnetic head mounted at a third position on said rotary drum 90°-separated from said first position in a direction opposite to the rotating direction of said rotary drum, and having said first azimuth angle;

a fourth magnetic head mounted at a fourth position on said rotary drum 180°-opposite to said third position, and having said first azimuth angle;

a fifth magnetic head mounted at a fifth position on said rotary drum 45°-separated from said first position in a direction opposite to the rotating direction of said rotary drum, and having a second azimuth angle of a polarity opposite to said first azimuth angle;

a sixth magnetic head mounted at a sixth position on said rotary drum 180°-opposite to said fifth position, and having said second azimuth angle;

a seventh magnetic head mounted at a seventh position on said rotary drum 135°-separated from said first position in a direction opposite to the rotating direction of said rotary drum, and having said second azimuth angle;

an eighth magnetic head mounted at a eighth position on said rotary drum 180°-opposite to said seventh position, and having said second azimuth angle;

a ninth magnetic head mounted at a position on said rotary drum close to said third magnetic head, and having said second azimuth angle;

a tenth magnetic head mounted at a position on said rotary drum close to said fourth magnetic head and 180°-opposite to said ninth magnetic head, and having said second azimuth angle;

first means for running said magnetic tape at a first speed, and for performing guard-bandless signal recording/reproducing on/from four tracks for one rotation of said rotary drum by using said first magnetic head, said ninth magnetic head, said second magnetic head and said tenth magnetic head, when recording/reproducing said first digital information signal; and second means for running said magnetic tape at a speed n times (n is a real number more than 1) faster than said first speed, and for performing guard-bandless signal recording/reproducing on/from eight tracks for one rotation of said rotary drum by using said first magnetic head, said fifth magnetic head, said third magnetic head, said seventh magnetic head, said second magnetic head, said sixth magnetic head, said fourth magnetic head and said eighth magnetic head, when recording/reproducing said second digital information signal.

10. A magnetic recording/reproducing apparatus according to claim 9,
wherein said third magnetic head and said ninth magnetic head, and said fourth magnetic head and said tenth magnetic head are respectively mounted on a common head base attached to said rotary drum.

11. A magnetic recording/reproducing apparatus according to claim 9, further comprising eleventh and twelfth magnetic heads,
said eleventh magnetic head being mounted at a position on said rotary drum close to said first magnetic head and 90°-separated from said tenth magnetic head in a direction opposite to the rotating direction of said rotary drum, and having said first azimuth angle, and said twelfth magnetic head being mounted at a position on said rotary drum close to said second magnetic head and 180°-opposite to said eleventh magnetic head, and having said first azimuth angle, and wherein said first means runs said magnetic tape at said first speed, and performs guard-bandless recording/reproducing of said first digital information signal on/from four tracks for one rotation of said rotary drum by using said eleventh magnetic head, said ninth magnetic head, said twelfth magnetic head and said tenth magnetic head.

12. A magnetic recording/reproducing apparatus according to claim 11, wherein said third magnetic head and said ninth magnetic head, said fourth magnetic head and said tenth magnetic head, said first magnetic head and said eleventh magnetic head, and said second magnetic head and said twelfth magnetic head are respectively mounted on a common head base attached to said rotary drum.

13. A magnetic recording/reproducing apparatus for selecting either of a first digital information signal having a first amount of information per unit time or a second digital information signal having a twice larger amount of information per unit time than said first amount of information, and for recording/reproducing the information signal on/from tracks formed in a diagonal direction on a magnetic tape, said apparatus comprising:

a first magnetic head mounted at a first position on a rotary drum, and having a first azimuth angle;

a second magnetic head mounted at a second position on said rotary drum 180°-opposite to said first position, and having said first azimuth angle;

a third magnetic head mounted at a third position on said rotary drum 90°-separated from said first position in a direction opposite to the rotating direction of said rotary drum, and having said first azimuth angle;

a fourth magnetic head mounted at a fourth position on said rotary drum 180°-opposite to said third position, and having said first azimuth angle;

a fifth magnetic head mounted at a fifth position on said rotary drum 45°-separated from said first position in a direction opposite to the rotating direction of said rotary drum, and having a second azimuth angle of a polarity opposite to said first azimuth angle;

a sixth magnetic head mounted at a sixth position on said rotary drum 180°-opposite to said fifth position, and having said second azimuth angle;

a seventh magnetic head mounted at a seventh position on said rotary drum 135°-separated from said first position in a direction opposite to the rotating direction of said rotary drum, and having said second azimuth angle;

an eighth magnetic head mounted at a eighth position on said rotary drum 180°-opposite to said seventh position, and having said second azimuth angle;

a ninth magnetic head mounted at a position on said rotary drum close to said third magnetic head, and having said second azimuth angle;

a tenth magnetic head mounted at a position on said rotary drum close to said fourth magnetic head and 180°-opposite to said ninth magnetic head, and having said second azimuth angle;

first means for running said magnetic tape at a first speed, and for performing guard-bandless signal recording/reproducing on/from four tracks for one rotation of said rotary drum by using said first magnetic head, said ninth magnetic head, said second magnetic head and said tenth magnetic head, when recording/reproducing said first digital information signal; and second means for running said magnetic tape at a speed n times (n is a real number more than 1) faster than said first speed, and for performing guard-bandless signal recording/reproducing on/from eight tracks for one rotation of said rotary drum by using said first magnetic head, said fifth magnetic head, said third magnetic head, said seventh magnetic head, said second magnetic head, said sixth magnetic head, said fourth magnetic head and said eighth magnetic head, when recording/reproducing said second digital information signal;

third means for running said magnetic tape at a second speed 1/m (m is a real number more than 1 and less than 2) of said first speed, and for performing guard-bandless signal recording/reproducing on/from two tracks for one rotation of said rotary drum by using said first magnetic head, said ninth magnetic head, said second magnetic head and said tenth magnetic head, when recording/reproducing said first digital information signal; and fourth means for running said magnetic tape at a speed n times faster than said second speed, and for performing guard-bandless signal recording/reproducing on/from four tracks for one rotation of said rotary drum by using said first magnetic head, said fifth magnetic head, said third magnetic head, said seventh magnetic head, said second magnetic head, said sixth magnetic head, said fourth magnetic head and said eighth magnetic head, when recording/reproducing said second digital information signal.

14. A magnetic recording/reproducing apparatus according to claim 13, wherein said third magnetic head and said ninth magnetic head, and said fourth magnetic head and said tenth magnetic head are respectively mounted on a common head base attached to said rotary drum.

15. A magnetic recording/reproducing apparatus according to claim 13, further comprising eleventh and twelfth magnetic heads, said eleventh magnetic head being mounted at a position on said rotary drum close to said first magnetic head and 90°-separated from said tenth magnetic head in a direction opposite to the rotating direction of said rotary drum, and having said first azimuth angle, and said twelfth magnetic head being mounted at a position on said rotary drum close to said second magnetic head and 180°-opposite to said eleventh magnetic head, and having said first azimuth angle, and wherein said first means runs said magnetic tape at said first speed, and performs guard-bandless recording/reproducing of said first digital information signal on/from four tracks for one rotation of said rotary drum by using said eleventh magnetic head, said ninth magnetic head, said twelfth magnetic head and said tenth magnetic head, and wherein said third means runs said magnetic tape at said second speed, and performs guard-bandless recording/reproducing of said first digital information signal on/from four tracks for one rotation of said rotary drum by using said eleventh magnetic head, said ninth magnetic head, said twelfth magnetic head and said tenth magnetic head.

16. A magnetic recording/reproducing apparatus according to claim 15,
wherein said third magnetic head and said ninth magnetic head, said fourth magnetic head and said tenth magnetic head, said first magnetic head and said eleventh magnetic head, and said second magnetic head and said twelfth magnetic head are respectively mounted on a common head base attached to said rotary drum.

* * * * *